(12) United States Patent
Tsuchiya et al.

(10) Patent No.: US 9,844,840 B2
(45) Date of Patent: Dec. 19, 2017

(54) FLUX FOR SOLDERING AND SOLDER PASTE COMPOSITION

(71) Applicant: TAMURA CORPORATION, Tokyo (JP)

(72) Inventors: Masahiro Tsuchiya, Iruma (JP); Akira Kitamura, Iruma (JP); Momoko Seino, Iruma (JP); Masaya Arai, Iruma (JP)

(73) Assignee: TAMURA CORPORATION, Tokyo (JP)

( * ) Notice: Subject to any disclaimer, the term of this patent is extended or adjusted under 35 U.S.C. 154(b) by 290 days.

(21) Appl. No.: 14/495,901

(22) Filed: Sep. 25, 2014

(65) Prior Publication Data
US 2015/0090367 A1 Apr. 2, 2015

(30) Foreign Application Priority Data
Sep. 30, 2013 (JP) .................. 2013-203069

(51) Int. Cl.
*B23K 35/36* (2006.01)
*B23K 35/02* (2006.01)
*B23K 35/362* (2006.01)

(52) U.S. Cl.
CPC ........ *B23K 35/3612* (2013.01); *B23K 35/025* (2013.01); *B23K 35/362* (2013.01)

(58) Field of Classification Search
CPC .............. B23K 35/3613; B23K 35/362; B23K 35/3612
USPC ........................................................ 148/23
See application file for complete search history.

(56) References Cited

U.S. PATENT DOCUMENTS

| | | | | |
|---|---|---|---|---|
| 2003/0051770 | A1* | 3/2003 | Nishina | B23K 35/3618 148/23 |
| 2005/0197479 | A1* | 9/2005 | Pavlin | A61K 8/02 528/64 |

FOREIGN PATENT DOCUMENTS

| | | |
|---|---|---|
| JP | 03-502662 | 6/1991 |
| JP | 2002-239785 | 8/2002 |
| JP | 2003-10997 | 1/2003 |
| JP | 2004-330269 | 11/2004 |
| JP | 2006-289497 | 10/2006 |
| JP | 2011-121059 | 6/2011 |
| WO | WO 89/06584 | 7/1989 |

OTHER PUBLICATIONS

Japanese Office Action for corresponding JP Application No. 2013-203069, dated Jul. 20, 2017 (w/ English machine translation).
Japanese Decision of a Patent Grant for corresponding JP Application No. 2013-203069, dated Sep. 7, 2017 (w/ English machine translation).

* cited by examiner

*Primary Examiner* — Weiping Zhu
(74) *Attorney, Agent, or Firm* — Mori & Ward, LLP

(57) ABSTRACT

A flux for soldering includes a base resin, a solvent, and an activating agent. The base resin contains a rosin. An amount of the rosin to be incorporated is from 0% by weight to 30% by weight with respect to a total amount of the base resin. The activating agent includes a compound having a plurality of carboxyl groups on a cyclohexyl structure represented by a general formula (1).

General Formula (1)

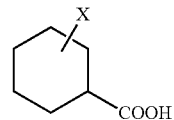

X is (a) one or more carboxyl groups, or (b) one or more carboxyl groups and at least one selected from a hydrogen atom, chloro group, bromo group, alkyl group, and cyclohexyl group. A position of the X is not limited. A number of the X is one or more. The X may have either one of the (a) and (b) alone, or a plurality of the (a) and (b) in combination.

5 Claims, No Drawings

FLUX FOR SOLDERING AND SOLDER PASTE COMPOSITION

CROSS-REFERENCE TO RELATED APPLICATIONS

The present application claims priority under 35 U.S.C. §119 to Japanese Patent Application No. 2013-203069, filed Sep. 30, 2013. The contents of this application are incorporated herein by reference in their entirety.

BACKGROUND OF THE INVENTION

1. Field of the Invention

The present invention relates to a flux for soldering and a solder paste composition.

2. Description of the Related Art

A solder paste composition used in mounting an electronic component on a board is prepared by mixing a flux for soldering and a solder alloy powder. When soldering is done with the use of this solder paste composition, a part of the flux for soldering tends to remain in the vicinity of a solder-jointed part on a board as a flux residue.

In general, the above mentioned flux for soldering contains a base resin, an activating agent and a solvent. In addition, as this base resin, a rosin is widely used conventionally.

In accordance with the recent higher performance, densification or the like of an electronics product, situations are increasing where a board is exposed to an environment having drastic changes in temperature. Under such an environment, a flux residue that is formed by using a flux for soldering, in which a rosin is used as a base resin, is easy to become hard and fragile, due to its inherent nature. Furthermore, the above mentioned flux residue becomes easy to crack with time. Accordingly, through the crack, water becomes easy to infiltrate a circuit part of a board, thereby creating problems including the short-circuit of a circuit and the metal corrosion of the circuit.

As a method for solving the above mentioned problems, there is a method for preventing the flux residue from remaining on a board at the completion of soldering, without incorporating any rosin into a flux for soldering, as disclosed in, for example, JP 2006-289497 A. In addition, there is a method in which another resin instead of a rosin is used as a base resin, or a rosin and another resin are used together, as disclosed in, for example, JP 2011-121059.

However, even when such a flux for soldering disclosed in JP 2006-289497 A mentioned above is used, it is difficult to completely eliminate the flux residue. In addition, a solder paste composition, in which a flux for soldering with the rosin content reduced is used, reduces the reflow property. Accordingly, it is necessary to increase the content of an activating agent for such a solder paste composition, which may disturb the printability of the solder paste composition.

In addition, a flux for a solder paste disclosed in JP 2011-121059 A mentioned above needs to incorporate a given amount of rosins, for the purpose of improving the printability of a solder paste composition. Accordingly, the flux residue that is formed by using such a solder paste composition causes uncertainty involving the crack initiation or development under an environment having drastic changes in temperature.

SUMMARY OF THE INVENTION

According to one aspect of the present invention, a flux for soldering includes a base resin, a solvent, and an activating agent. The base resin contains a rosin. An amount of the rosin to be incorporated is from 0% by weight to 30% by weight with respect to a total amount of the base resin. The activating agent includes a compound having a plurality of carboxyl groups on a cyclohexyl structure represented by a general formula (1).

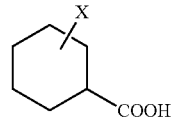

General Formula (1)

X is (a) one or more carboxyl groups, or (b) one or more carboxyl groups and at least one selected from a hydrogen atom, chloro group, bromo group, alkyl group, and cyclohexyl group. A position of the X is not limited. A number of the X is one or more. The X may have either one of the (a) and (b) alone, or a plurality of the (a) and (b) in combination.

According to another aspect of the present invention, a solder paste composition includes a solder alloy powder and a flux for soldering. The flux for soldering includes a base resin, a solvent, and an activating agent. The base resin contains a rosin. An amount of the rosin to be incorporated is from 0% by weight to 30% by weight with respect to a total amount of the base resin. The activating agent includes a compound having a plurality of carboxyl groups on a cyclohexyl structure represented by a general formula (1).

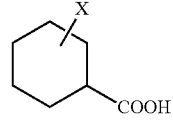

General Formula (1)

X is (a) one or more carboxyl groups, or (b) one or more carboxyl groups and at least one selected from a hydrogen atom, chloro group, bromo group, alkyl group, and cyclohexyl group. The position of the X is not limited. A number of the X is one or more. The X may have either one of the (a) and (b) alone, or a plurality of the (a) and (b) in combination.

DESCRIPTION OF THE EMBODIMENTS

A detailed description will hereinafter be given of an embodiment of the flux for soldering and the solder paste composition of the present disclosure. It goes without saying that the present invention will not be limited to the embodiment.

EMBODIMENT

1. A Flux for Soldering
(1) a Base Resin
<A Rosin>

A rosin used as a base resin in the embodiment includes, for example, a rosin such as a tall oil rosin, gum rosin, and wood rosin; a rosin derivative such as a hydrogenated rosin, polymerized rosin, disproportionated rosin, acrylic acid modified rosin, and maleic acid modified rosin; or the like.

The rosins mentioned above may be used alone or in combination. In addition, the rosin usable in the flux for soldering of the embodiment is not limited thereto.

The amount of the rosin to be incorporated is from 0% by weight to 30% by weight with respect to a total amount of the base resin. In other words, even when the rosin content is 0, a solder paste composition in which the flux for soldering of the embodiment is used may achieve a good reflow property.

<A Resin Other than the Rosin>

Into the base resin in the embodiment, a resin other than the rosin may be incorporated, including, for example, an acrylic resin, styrene-maleic acid resin, epoxy resin, urethane resin, polyester resin, phenoxy resin, terpene resin, or the like.

The other resins mentioned above may be used alone or in combination. In addition, the resin usable in the flux for soldering of the embodiment is not limited thereto.

Particularly, an acrylic resin is preferably used as the other resin mentioned above. Such an acrylic resin is obtained by polymerizing a monomer alone or copolymerizing a plurality of types of monomers, such as a carboxyl group-containing monomer such as (meth)acrylic acid, itaconic acid, maleic acid, and crotonic acid; and a monomer such as octyl(meth)acrylate, nonyl(meth)acrylate, decyl(meth)acrylate, undecyl(meth)acrylate, dodecyl(meth)acrylate, tridecyl(meth)acrylate, tetradecyl(meth)acrylate, lauryl(meth)acrylate, stearyl(meth)acrylate, and an isoform thereof, methyl(meth)acrylate, ethyl(meth)acrylate, butyl(meth)acrylate, hexyl(meth)acrylate, propyl(meth)acrylate.

Among the acrylic resins mentioned above, particularly the following resins are preferably used:
(i) (a) an acrylic resin obtained through a polymerization reaction of a long-chain alkyl group-containing (meth) acrylic monomer;
(ii) an acrylic resin obtained by copolymerizing the monomer (a), and at least one of (b) a (meth)acrylic acid and (c) (meth)acrylic monomer other than the monomer (a).

The glass transition temperature (Tg) and acid value of the acrylic resin mentioned above may be appropriately adjusted based on the ratio or amount of the used monomer(s) to be incorporated, the condition at polymerization or copolymerization, or the like.

In addition, it is preferable that the amount of the base resin to be incorporated be from 30% by weight to 60% by weight with respect to a total amount of the flux for soldering.

(2) an Activating Agent

<A Compound Having a Plurality of Carboxyl Groups on a Cyclohexyl Structure>

An activating agent used in the flux for soldering of the embodiment includes a compound having a plurality of carboxyl groups on a cyclohexyl structure represented by the general formula (1):

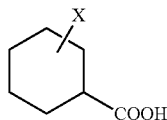

General Formula (1)

wherein the X is (a) one or more carboxyl groups, or (b) one or more carboxyl groups and at least one selected from the group of a hydrogen atom, chloro group, bromo group, alkyl group, cyclohexyl group and the like,
the position of the X is not limited,
the number of the X is one or more, and
the X may have either one of the (a) and (b) alone, or a plurality of the (a) and (b) in combination.

In general, when the rosin content in a flux for soldering is small, the reflow property of a solder paste composition may be disturbed. A common method for improving the reflow property includes increasing the amount of the activating agent to be incorporated.

A short-chain fatty acid such as adipic acid and succinic acid, which is conventionally used as the activating agent, will be volatilized or decomposed by heat in the event of the pre-heating in the soldering step, even when the amount of the short-chain fatty acid to be incorporated is increased. Accordingly, such a solder paste composition is difficult to achieve an improving effect on the reflow property, but rather may decrease the resistance to crack in its flux residue.

On the other hand, in a case where a long-chain fatty acid is used as the activating agent, in order to improve the reflow property of a solder paste composition, an amount of the long-chain fatty acid that will be sufficient to disturb the printability is preferably incorporated. In addition, in this case, the resistance to crack in its flux residue may be disturbed.

However, because the solder paste composition in which the flux for soldering of the embodiment is used includes the compound having a plurality of carboxyl groups on a cyclohexyl structure represented by the general formula (1) as the activating agent, the content by percentage of carboxyl groups is high and the volatility is low at high temperature. Therefore, even when the rosin content is low, the solder paste composition may achieve a good reflow property without increasing the amount of the activating agent to be incorporated.

The compound having a plurality of carboxyl groups on a cyclohexyl structure may be any one represented by the general formula (1). Such a compound includes, for example, 1,4-cyclohexanedicarboxylic acid, 1,3-cyclohexanedicarboxylic acid, hydrogenated trimellitic acid, and hydrogenated pyromellitic acid. Among them, particularly 1,4-cyclohexanedicarboxylic acid, hydrogenated trimellitic acid, and hydrogenated pyromellitic acid are preferably used. These may be used alone or in combination.

It is preferable that the amount of the compound mentioned above to be incorporated be of 0.5% by weight or more with respect to a total amount of the flux for soldering.

<The Other Activating Agent>

As the activating agent in the flux for soldering of the embodiment, the compound having a plurality of carboxyl groups on a cyclohexyl structure may be used alone or in combination with the other activating agent than the compound.

The other activating agent than the compound having a plurality of carboxyl groups on a cyclohexyl structure includes, for example, an amine salt (inorganic acid salt or organic acid salt) such as a hydrohalide salt of an organic amine, organic acid, organic acid salt, organic amine salt or the like. A specific example includes a diphenylguanidine hydrobromate salt, cyclohexylamine hydrobromate salt, diethyl amine salt, acid salt, succinic acid, adipic acid, sebacic acid or the like. These may be used alone or in combination. In addition, the activating agent usable in the flux for soldering of the embodiment is not limited thereto.

As to the amount of the other activating agent to be incorporated, it is preferable that a total amount of the other activating agent and the compound having a plurality of carboxyl groups on a cyclohexyl structure be from 5% by weight to 15% by weight with respect to a total amount of the flux for soldering.

(3) A Solvent

A solvent used for a flux for soldering of the embodiment includes, for example, isopropyl alcohol, ethanol, acetone, toluene, xylene, ethyl acetate, ethylcellosolve, butylcellosolve, glycol ether or the like. These may be used alone or in combination. In addition, the solvent usable for the flux for soldering of the embodiment is not limited thereto.

It is preferable that the amount of the solvent to be incorporated be from 20% by weight to 50% by weight with respect to a total amount of the flux for soldering.

(4) An Antioxidant

An antioxidant may be incorporated into the flux for soldering of the embodiment for the purpose of suppressing the oxidation of a solder alloy powder. The antioxidant includes, for example, a hindered phenolic antioxidant, phenolic antioxidant, bisphenolic antioxidant, polymer type antioxidant or the like. Among them, particularly a hindered phenolic antioxidant is preferably used. Moreover, these may be used alone or in combination. In addition, the antioxidant usable in the flux for soldering of the embodiment is not limited thereto.

The amount of the antioxidant to be incorporated is not particularly limited. The general amount thereof to be incorporated is from approximately from 0.5% by weight to 5% by weight with respect to a total amount of the flux for soldering.

(5) A Thixotropic Agent

A thixotropic agent may be incorporated into the flux for soldering of the embodiment for the purpose of adjusting the solder paste composition so as to have a suitable viscosity for printing. Such a thixotropic agent includes, for example, a hydrogenated castor oil, fatty acid amides, hydroxy fatty acids or the like. In addition, the thixotropic agent usable in the flux for soldering of the embodiment is not limited thereto.

It is preferable that the amount of the thixotropic agent to be incorporated be from 3% by weight to 15% by weight with respect to a total amount of the flux for soldering.

(6) An Additive Agent

An additive agent such as a halogen, flatting agent and antifoaming agent may be further added into the flux for soldering of the embodiment. It is preferable that the amount of the additive agent to be incorporated be of 10% by weight or less, or it is more preferable that the amount thereof be of 5% by weight, with respect to a total amount of the flux for soldering.

2. A Solder Alloy Powder

A solder alloy powder used in the solder paste composition of the embodiment includes one combining two or more of, for example, Sn, Ag, Cu, Bi, Zn, In, Ga, Sb, Au, Pd, Ge, Ni, Cr, Al, P, In, Pb and the like. As the representative solder alloy powder, a lead-free solder alloy powder such as Sn—Ag—Cu and Sn—Ag—Cu—In is used, but a lead-containing solder alloy powder may also be used.

It is preferable that the amount of the solder alloy powder to be incorporated be of 65% by weight or more but 95% by weight or less with respect to a total amount of the solder paste composition. The more preferable amount thereof to be incorporated is of 85% by weight or more but 93% by weight or less, or the particularly preferable amount thereof to be incorporated is of 89% by weight or more but 92% by weight or less.

The solder paste composition having an amount of the solder alloy powder to be incorporated less than 65% by weight tends to become difficult to form an enough solder joint at the time of soldering. On the other hand, the solder paste composition having an amount of the solder alloy powder to be incorporated more than 95% by weight has an insufficient flux for soldering as a binder, with the result that the flux for soldering and the solder alloy powder tend to become difficult to be mixed.

The solder paste composition of the embodiment is prepared by mixing the flux for soldering mentioned above and the solder alloy powder mentioned above using a well-known method.

EXAMPLES

A detailed description will hereinafter be given of the embodiment of the present invention with reference to Examples and Comparative Examples. It goes without saying that the present invention will not be limited to these Examples.

Production of an Acrylic Resin

A solution 1 was prepared in which 40% by weight of a compound represented by the general formula (2) and 60% by weight of a compound represented by the general formula (3) were mixed.

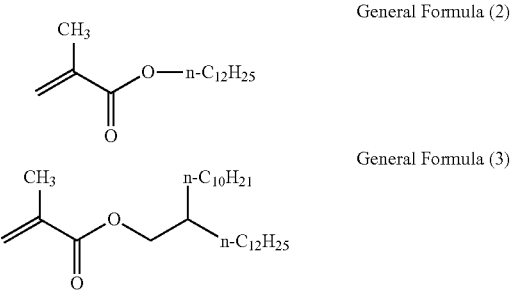

In a 500 ml four neck flask equipped with an agitator, recirculating pipe and nitrogen introducing pipe, 200 g of diethyl hexyl glycol was placed and heated to 110° C. Subsequently, in the solution 1 (300 g in total), 0.2% by weight to 5% by weight of an azoic radical initiator (dimethyl 2,2'-azobis(2-methyl propionate), commercial name: V-601, made by Wako Pure Chemical Industries, Ltd.) was added and dissolved. The resultant solution was dropped over 1.5 hours, followed by stirring for 1 hour at 110° C. Completion of the reaction gave an acrylic resin. The acrylic resin had a weight-average molecular weight of 15,000, and an acid value of 0 mgKOH/g.

Preparation of a Solder Paste

In accordance with the composition and formulation indicated in Table 1, the respective ingredients were mixed and kneaded, and then the respective fluxes for soldering according to Examples 1 to 4 and Comparative Examples 1 to 7 were prepared. Note that in Table 1, the unit of the numerical value relating to the composition is % by weight, unless otherwise indicated.

Subsequently, 12% by weight of the respective fluxes for soldering mentioned above were mixed with 88% by weight of a Sn-3Ag-0.5Cu solder alloy powder, and then the respective solder paste compositions according to Examples 1 to 4 and Comparative Examples 1 to 7 were obtained.

TABLE 1

| | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Acrylic Resin | Acrylic resin (Synthetic) | 40 | 40 | 40 | 35 | 35 | 40 | 40 | 40 | 40 | 40 | 40 | |
| Rosin | KE-604 | 5 | 5 | 5 | 10 | 0 | 5 | 5 | 5 | 5 | 5 | 5 | 40 |
| Compound Having Carboxyl Group On Cyclohexyl Structure | Cyclohexanecarboxylic acid | 5 | | | | | | | | | | | 5 |
| | 1,4-Cyclohexanedicarboxylic acid | | 5 | | | 10 | | | | | | | |
| | H-TMA *2 | | | 5 | 0.5 | | | | | | | | |
| Other Activating Agent | Succinic acid | | | | | | 5 | | | | | | |
| | Adipic acid | | | | | 5 | | 5 | | | | | |
| | SL-20 *3 | | | | | | | | 5 | | | | |
| | Dimer acid | | | | | | | | | 5 | | | |
| | Terephthalic acid | | | | | | | | | | 5 | | |
| | Trimellitic acid | | | | | | | | | | | 5 | 5 |
| Thixotropic agent | SLIPACKS ZHH *4 | 7 | 7 | 7 | 7 | 7 | 7 | 7 | 7 | 7 | 7 | 7 | 7 |
| Antioxidant | IRGANOX 245 *5 | 1 | 1 | 1 | 1 | 1 | 1 | 1 | 1 | 1 | 1 | 1 | 1 |
| Solvent | 2-ethylhexy diglycol | 42 | 42 | 42 | 46.5 | 42 | 42 | 42 | 42 | 42 | 42 | 42 | 42 |

*1 Hydrogenated rosin made by Arakawa Chemical Industries, Ltd.
*2 Hydrogenated trimellitic acid anhydride made by Mitsubishi Gas Chemical Company, Inc.
*3 Eicosanedioic acid made by Okamura Oil Mill Co., Ltd.
*4 Fatty acid amide made by Nippon Kasei Chemical Co., Ltd.
*5 Hindered phenolic antioxidant made by BASF Japan Ltd.

The respective solder paste compositions according to Examples 1 to 4 and Comparative Examples 1 to 7 were measured and evaluated as follows. The results are indicated in Table 2.

<The Reflow Property (Solder Wettability)>

In accordance with the condition specified in JIS standard Z3284 (1994), Annex 10, respective test pieces of the solder paste compositions were prepared, and a test for the wetting effect was done. Subsequently, the whole appearance of the respective test pieces at the completion of the test was evaluated as follows.

Note that the respective test pieces prepared were exposed to a pre-heating treatment with the use of a hot plate at 180° C. for 60 seconds, and then molten in a solder bath at 270° C.

○: all of the parts coated with the solder paste composition are in a wet state with a solder.

Δ: almost all of the parts coated with the solder paste composition are in a wet state with a solder (dewetting is also included)

x: there is no appearance of the test piece wetted with a solder, but one or more solder balls of a molten solder are on the test piece (non-wetting).

<The Preservation Stability>

The respective solder paste compositions were stored at 30° C. for 3 days, and then the viscosity thereof was measured with the use of a viscometer (product name: PCU-205, made by Malcom Co., Ltd.) and evaluated as follows.

○: the rate of change of the viscosity with respect to the initial value is ±30% or less x: the rate of change of the viscosity with respect to the initial value is beyond ±30%

<The Resistance to Crack in the Residue>

On a board on which a QFP (Quad Flat Package) pattern having a pitch of 0.8 mm was present, the respective solder paste compositions were printed with the use of a metal mask having the same pattern and a thickness of 150 μm. Within 10 minutes from the completion of the printing, a reflow was performed to the respective printed boards under an oxygen concentration of 4,000 ppm at a maximum temperature of 240° C., with the use of a reflow furnace (product name: TNP40-577PH, made by Tamura Corporation). After the respective reflowed boards were left at 150° C. for 200 hours, to these was applied a cool-heat cycle load including 50 cycles, each one cycle of which is from −40° C.×30 minutes to 125° C.×30 minutes, with the result that respective test pieces were prepared. The state of crack initiation in a soldered part of the QFP pattern on the respective test pieces was visually observed and evaluated based on the following criteria.

○: the number of cracks connecting terminals of QFP joint parts (96 in total) is less than 10.

x: the number of cracks connecting terminals of QFP joint parts (96 in total) is 10 or more.

TABLE 2

|  |  | Example 1 | Example 2 | Example 3 | Example 4 | Example 5 | Comparative Example 1 | Comparative Example 2 |
|---|---|---|---|---|---|---|---|---|
| Wetting effect | Wettability to copper | ○ | ○ | ○ | ○ | ○ | ○ | ○ |
|  | Wettability to brass | ○ | ○ | ○ | ○ | ○ | X | X |
| Preservation stability | | ○ | ○ | ○ | ○ | ○ | X | X |
| Resistance to crack in residue | | ○ | ○ | ○ | ○ | ○ | ○ | ○ |

|  |  | Comparative Example 3 | Comparative Example 4 | Comparative Example 5 | Comparative Example 6 | Comparative Example 7 |
|---|---|---|---|---|---|---|
| Wetting effect | Wettability to copper | X | X | X | X | ○ |
|  | Wettability to brass | X | X | X | X | ○ |
| Preservation stability | | ○ | ○ | ○ | X | ○ |
| Resistance to crack in residue | | ○ | ○ | ○ | ○ | X |

From the above, as indicated in Examples, it is found that the solder paste compositions of the Examples exhibit a good reflow property and preservation stability, and have an excellent resistance to crack in their flux residues, when the rosin content is small, and even when the rosin content is 0.

When a short-chain organic acid which does not have a cyclohexyl structure is used as the activating agent, as in the case of Comparative Example 1 and Comparative Example 2, the wettability to brass and the preservation stability are disturbed. In addition, when a long-chain organic acid which does not have a cyclohexyl structure is used as the activating agent, as in the case of Comparative Example 3 and Comparative Example 4, the wettability to copper and brass is disturbed. Furthermore, when an aromatic carboxylic acid which does not have a cyclohexyl structure is used as the activating agent, as in the case of Comparative Example 5 and Comparative Example 6, the wettability to copper and brass, and the preservation stability are disturbed. Moreover, when the rosin content is large, as in the case of Comparative Example 7, the resistance to crack in the flux residue is disturbed.

Accordingly, because the solder paste compositions of the Examples are excellent in the reflow property and the preservation stability, as well as excellent in the resistance to crack in the flux residue, they may be suitably used for a board that will be used under an environment where a particularly high reliability is required.

The embodiment of the present invention provides a flux for soldering capable of, even with the rosin content reduced, exhibiting a good reflow property, good preservation stability, and inhibiting effect on the crack initiation and crack development in the flux residue under a severe cool-heat cycle environment over a long period of time.

In addition, the embodiment of the present invention provides a solder paste composition, in which is used a flux for soldering capable of exhibiting a good reflow property, good preservation stability, and inhibiting effect on the crack initiation and crack development in the flux residue under a severe cool-heat cycle environment over a long period of time.

The embodiment of the present invention is characterized by being composed as follows in order to obtain the above mentioned benefits.

(1) A flux for soldering of the embodiment of the present invention includes a base resin containing a rosin, the amount of the rosin to be incorporated being from 0% by weight to 30% by weight with respect to a total amount of the base resin, an activating agent including a compound having a plurality of carboxyl groups on a cyclohexyl structure represented by the general formula (1)

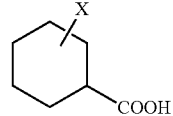

General Formula (1)

wherein the X is (a) one or more carboxyl groups, or (b) one or more carboxyl groups and at least one selected from the group of a hydrogen atom, chloro group, bromo group, alkyl group, cyclohexyl group and the like, one or more positions of the X are present, the number of the X is either one or more, and the X may have either one of the (a) and (b) alone, or a plurality of the (a) and (b) in combination, and a solvent.

(2) In the composition of the item (1), the amount of the compound to be incorporated having a plurality of carboxyl groups on a cyclohexyl structure represented by the general formula (1) is of 0.5% by weight or more with respect to a total amount of the flux for soldering.

(3) In the composition of the item (1) or (2), the compound having a plurality of carboxyl groups on a cyclohexyl structure represented by the general formula (1) is at least one selected from the group of cyclohexanedicarboxylic acid, hydrogenated trimellitic acid, and hydrogenated pyromellitic acid.

(4) In the composition of any one of the items (1) to (3), the flux for soldering of the embodiment of the present invention has the amount of the base resin to be incorporated from 30% by weight to 60% by weight with respect to a total amount of the flux for soldering, the amount of the activating agent to be incorporated from 5% by weight to 15% by weight with respect to a total amount of the flux for soldering, the amount of the solvent to be incorporated from 20% by weight to 50% by weight with respect to a total amount of the flux for soldering, the amount of the rosin to be incorporated from 0% by weight to 30% by weight with respect to a total amount of the base resin, and the amount of the compound to be incorporated having a plurality of carboxyl groups on a cyclohexyl structure represented by the general formula (1) of 0.5% by weight or more with respect to a total amount of the flux for soldering.

(5) A solder paste composition of an aspect of the embodiment of the present invention includes the flux for soldering according to any one of the items (1) to (4), and a solder alloy powder.

In accordance with the embodiment of the present invention, even when the flux for soldering has a reduced rosin content, it is possible to exhibit a good reflow property and good preservation stability, as well as to inhibit the crack initiation and development in the flux residue under a severe cool-heat cycle environment over a long period of time.

Obviously, numerous modifications and variations of the present invention are possible in light of the above teachings. It is therefore to be understood that within the scope of the appended claims, the invention may be practiced otherwise than as specifically described herein.

What is claimed is:

1. A flux for soldering, comprising:
a base resin containing an acrylic resin and a rosin, an amount of the rosin to be incorporated being from 0% by weight to 30% by weight with respect to a total amount of the base resin;
a solvent; and
an activating agent including a compound having a plurality of carboxyl groups on a cyclohexyl structure represented by a general formula (1)

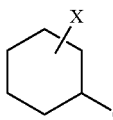

General Formula (1)

wherein X is (a) one or more carboxyl groups, or (b) one or more carboxyl groups and at least one selected from a hydrogen atom, chloro group, bromo group, alkyl group, and cyclohexyl group,
a position of the X is not limited,
a number of the X is one or more, and
the X may have either one of the (a) and (b) alone, or a plurality of the (a) and (b) in combination, and
wherein an amount of the activating agent to be incorporated is from 5% by weight to 15% by weight with respect to the total amount of the flux for soldering.

2. The flux for soldering according to claim 1, wherein an amount of the compound to be incorporated having a plurality of carboxyl groups on a cyclohexyl structure represented by the general formula (1) is of 0.5% by weight or more with respect to a total amount of the flux for soldering.

3. The flux for soldering according to claim 1, wherein the compound having a plurality of carboxyl groups on a cyclohexyl structure represented by the general formula (1) is at least one of cyclohexanedicarboxylic acid, hydrogenated trimellitic acid, and hydrogenated pyromellitic acid.

4. The flux for soldering according to claim 1,
wherein an amount of the base resin to be incorporated is from 30% by weight to 60% by weight with respect to a total amount of the flux for soldering,
an amount of the solvent to be incorporated is from 20% by weight to 50% by weight with respect to the total amount of the flux for soldering,
the amount of the rosin to be incorporated is from 0% by weight to 30% by weight with respect to the total amount of the base resin, and
an amount of the compound to be incorporated having a plurality of carboxyl groups on a cyclohexyl structure represented by the general formula (1) is of 0.5% by weight or more with respect to the total amount of the flux for soldering.

5. A solder paste composition, comprising:
a solder alloy powder; and
a flux for soldering, comprising:
a base resin containing an acrylic resin and a rosin, an amount of the rosin to be incorporated being from 0% by weight to 30% by weight with respect to a total amount of the base resin;
a solvent; and
an activating agent including a compound having a plurality of carboxyl groups on a cyclohexyl structure represented by a general formula (1)

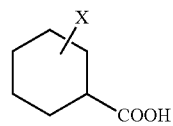

General Formula (1)

wherein X is (a) one or more carboxyl groups, or (b) one or more carboxyl groups and at least one selected from a hydrogen atom, chloro group, bromo group, alkyl group, and cyclohexyl group,
a position of the X is not limited,
a number of the X is one or more, and
the X may have either one of the (a) and (b) alone, or a plurality of the (a) and (b) in combination, and
wherein an amount of the activating agent to be incorporated is from 5% by weight to 15% by weight with respect to the total amount of the flux for soldering.

* * * * *